Dec. 9, 1941. M. A. STICELBER 2,265,552
DOUGH MIXER
Filed June 10, 1940
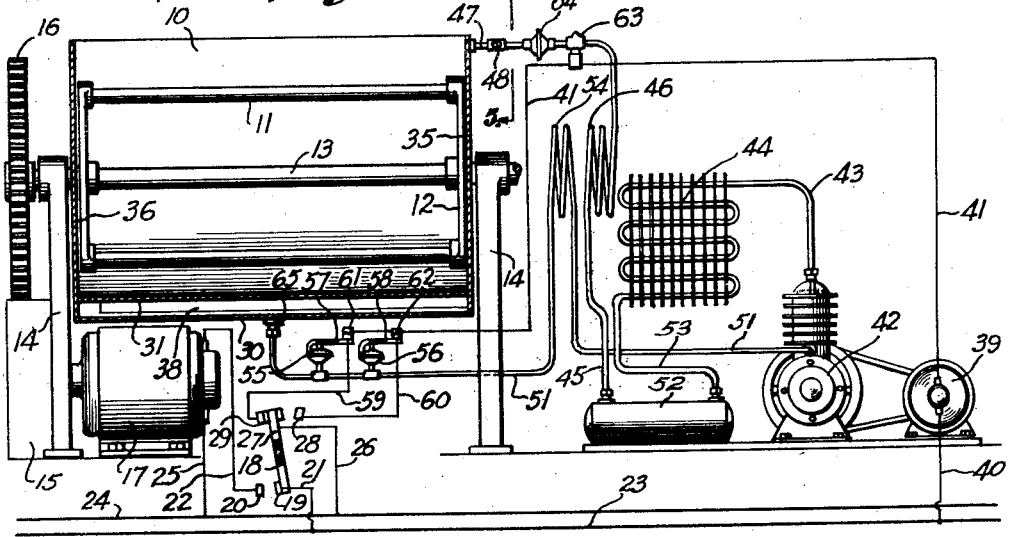
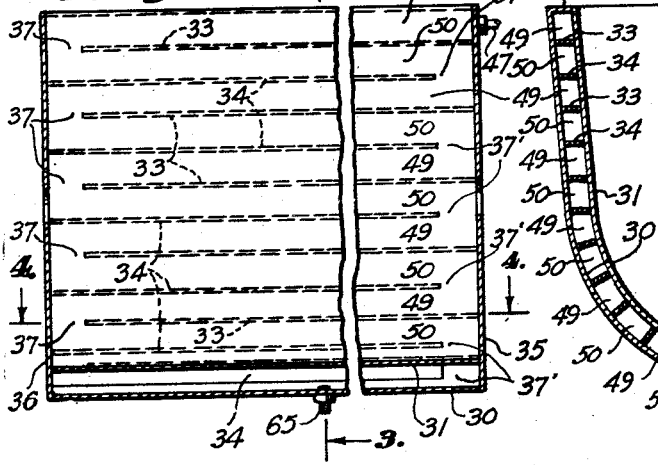
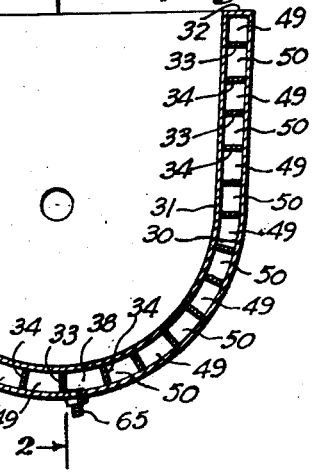
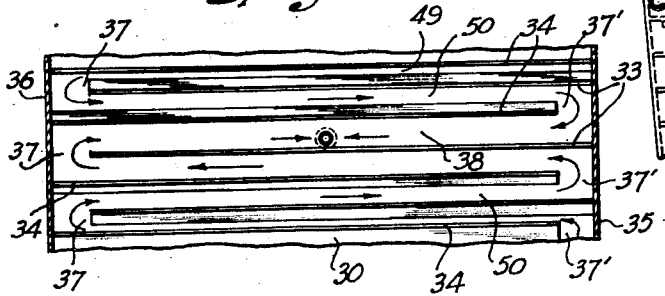
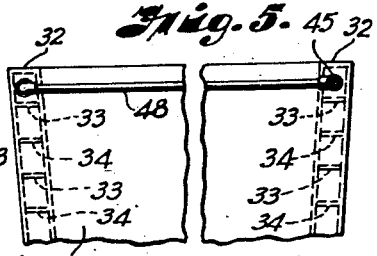
INVENTOR
Merlin A. Sticelber
BY Alfred R. Fuchs
ATTORNEY

UNITED STATES PATENT OFFICE 2,265,552

DOUGH MIXER

Merlin A. Sticelber, Kansas City, Mo.

Application June 10, 1940, Serial No. 339,639

13 Claims. (Cl. 62—1)

My invention relates to dough mixers, and more particularly to a dough mixer provided with means for maintaining desired temperature conditions within the same.

In the art of mixing dough it is desirable to carry on the mixing action to a stage such that the highest gluten development from the flour in the dough can be obtained. This is accomplished by the mixing, or kneading, action of the agitator members, or beater arms, in the dough mixer, and is dependent upon the length of time that the mixing operation takes place, as well as the rate at which the same takes place. Due to the heat generated in the agitation process, or mixing process, caused by the mechanical movement of the mass within the mixer, as well as the heat developed by the action of the yeast on the dough, there is a gradual rise in temperature of the contents of the dough mixer from the beginning of the mixing operation, which rise in temperature is accelerated as the operation proceeds. Inasmuch as it is harmful to the quality of the dough to have the temperature thereof rise above a certain point in the mixer, it is necessary to shorten the mixing operation below that most desirable for full gluten development, to prevent too high temperature developing in the dough in the mixer. It is a purpose of my invention to provide a method and means for carrying out the method of mixing a dough, whereby the full length of time of mixing can be carried out, to get the greatest development of gluten without having the temperature rising to a point that is too high for the dough.

Some attempt has been made prior to my invention to cool down the contents of the dough mixer, so as to prevent the maximum temperature attained from getting to too high a point. One method that has been used for a considerable period of time is to put ice in the dough and, it has also been common practice to start the dough with cold water, the water being as near to the freezing point as practicable when the mixing of the dough is started. Obviously the use of ice provides for uneven temperature conditions in the contents of the mixer, and also makes it necessary to allow for the increase in the water content of the dough as the ice melts, the water content, increasing as the dough is mixed, due to the melting of the ice. The use of ice involves considerable inconvenience and calculation to get the proper moisture content of the dough.

It has been attempted to avoid the use of ice by providing a jacket around part of the mixer body, through which cold water is circulated to cool the contents of the mixer. This has, however, not been successful, as it has been necessary, for at least part of the time, if not at all times, to supplement the cooling obtained in this manner by the use of ice, just as was done prior to the provision of such a water jacket. In order to obtain any appreciable effect from the cooling of the water at all, it is necessary that it be circulated in large volume and at a rapid rate, necessitating the use of much power to provide for the cooling of the water and the circulation thereof from the point of cooling to the water jacket around the mixer bowl, or body. My invention provides cooling means for the mixer that avoids all necessity of the use of ice in the dough batch that is being mixed, and which is much less expensive to operate, because much less power is needed for accomplishing the cooling than is necessary to obtain the rather ineffective cooling that is accomplished by means of cold water, as above referred to.

Cold water has been used because of the fact that if frost should be formed on the inner surface of the mixer bowl, or body, this would interfere with the proper mixing of the dough, causing icy particles to be present in the dough and also preventing the proper movement of the dough over the walls of the mixer to get the proper kneading and agitating action of the beater arms, or agitator members, in the mixer, as the dough would tend to adhere to the frosty surface. It is accordingly a purpose of my invention to provide means for cooling the contents of a dough mixer, by refrigerating the walls thereof, so that frost will not form thereon, but the temperature will be kept low enough that the heat will be extracted from the dough sufficiently that the dough can be mixed to the full extent desired to obtain the proper gluten development in the dough. This is accomplished by providing direct refrigeration on the wall of the mixer, by means of an expansion coil formed on the walls of the dough mixer to cool the walls that the dough contacts, to a point above the freezing point of water, before any dough mixture is placed in the mixer, and below the freezing point of water sufficiently to extract the desired heat from the dough, without causing any frost to form on the inner surface, or face, of the mixer, when the dough is being mixed. In order to accomplish this, controlling means must be provided for maintaining substantially a uniform temperature of the mixer wall while the mixing operation is taking place, that is lower than a uniform temperature of the wall when there is no mixing of the dough taking place, means being provided for maintaining this higher uniform temperature, similar to the means for maintaining the lower uniform temperature, and means being provided for transferring the control of the temperature from one of said controls to the other thereof when the mixing operation is commenced.

It is a further purpose of my invention to provide a dough mixer with cooling means, comprising an expansion coil forming part of the mixing chamber wall, or in heat conducting relation thereto, said expansion chamber being made up of a plurality of adjacent passages forming a circuitous path for the refrigerant, extending continuously from a point of entrance of the refrigerant to a point of discharge thereof, one means for obtaining this circuitous path being illustrated in the drawing, and other means being obviously possible.

It is another important purpose of my invention to provide a new and improved method of mixing a dough, comprising the placing of the ingredients of the dough mixture into a container having walls which are cooled to a temperature above the freezing point of water, and agitating the dough mixture for the desired length of time in said container, with said walls thereof maintained at a lower temperature than the freezing point of water, to maintain the maximum temperature of the dough below a safe temperature, to prevent any damage to the quality of the dough.

Other objects and advantages of my invention will appear as the description of the drawing proceeds. I desire to have it understood, however, that I do not intend to limit myself to the particular details shown or described, except as defined in the claims.

In the drawing:

Fig. 1 is a diagrammatic view of a dough mixer and the cooling means therefor, comprising my invention.

Fig. 2 is a longitudinal sectional view, partly broken away, through the bowl, or body portion, of the dough mixer, made in accordance with my invention, taken substantially on the line 2—2 of Fig. 3.

Fig. 3 is a vertical sectional view taken at right angles to Fig. 2, on substantially the line 3—3 of Fig. 2.

Fig. 4 is a fragmentary section taken on the line 4—4 of Fig. 2, and

Fig. 5 is a fragmentary section taken on the line 5—5 of Fig. 1.

Referring in detail to the drawings, in Fig. 1 is shown a dough mixer having a body portion 10 and beater arms, or agitator members, 11, operating in the chamber formed within said body portion, which are mounted in any suitable manner, such as on the spider 12, for rotation about an axis, said spider being fixed on the shaft 13 to rotate therewith. The shaft 13 is mounted in bearing members 14 and is rotated by means of suitable gearing enclosed in a housing 15, driving the large gear wheel 16 that is fixed on the shaft 13, from the motor 17 in an obvious manner.

The motor 17 is controlled by means of a switch 18 having the movable contact 19 adapted to engage the stationary contact 20 connected, respectively, with a conductor 21 leading to a line wire 23, and a conductor 22 leading to the motor, the other line wire 24 being shown as being connected with the motor through a conductor 25. While any desired switching means may be utilized, a simple switching means is illustrated diagrammatically in Fig. 1, as above set forth, whereby the motor 17 will be supplied with current for driving the same when the switch 18 is in the alternative position to that shown in Fig. 1, and is not supplied with current from the line wires when the switch is in the position shown in Fig. 1. A conductor 26 also leads from the conductor 24 to a movable switching element 27, which is part of the switching means 18, and insulated from the end of said switching means, provided with the contact 19. Said movable contact member 27 is adapted to engage either the stationary contact 28 or the stationary contact 29, as will be explained below.

A suitable refrigerating element, in heat conducting relation with the wall of the body portion 10 of the mixer, is provided, and in the form illustrated, the refrigerating element is provided by means of a jacket on the body portion extending along the two inclined side walls and the bottom wall of said body portion in spaced relation to the inner wall thereof, with which the contents of the dough mixer engage, the wall forming said jacket being indicated by the numeral 30, and being connected with the inner wall 31 by means of a top wall portion 32. Thus a chamber is formed extending from one of the top wall portions 32 to the other top wall portion 32, around the curved bottom of the bowl, or mixer body. It is desirable to provide a circuitous path for the refrigerant in this chamber, and to accomplish this purpose, the baffle members 33 and 34 are provided. The baffle member 33 in each of the inclined wall portions is secured in fluid tight relation to one of the end walls 35 of said jacket, and is spaced from the other end wall 36 to provide an opening 37 between said baffle and said end wall 36, while the next adjacent baffle 34 is connected in fluid tight relation with the end wall 36 of the jacket, and is spaced at 37' from the end wall 35, the baffle members 33 and 34 alternating in each of the jacket portions along the inclined walls of the mixer, to thus provide passages between the same that extend back and forth across the face of the wall from the top thereof adjacent one end of said wall to the bottom curved wall portion, at which point a passage 38 is provided between a baffle 33 and a baffle 34, into which the refrigerant passing down both inclined walls of the mixing chamber, or bowl, enters.

My refrigerating means for the wall of a dough mixer body, or bowl, further comprises any suitable form of refrigerating system, in which the expansion of a gas accomplishes the refrigeration of the walls, by direct expansion within the refrigerating element in heat conducting relation with the walls of the dough mixer, and which is adapted to have the controlling means to be described, utilized to control the temperature of the inner wall portion 31 of the dough mixer body to maintain the same at two different temperatures, as will be described below.

A conventional form of refrigerating system is illustrated, in which a motor 39 is provided, electrical energy being supplied thereto through a conductor 40, extending from the line wire 23, and a conductor 41, which leads to suitable thermostatically controlled switching means, to be described below. The motor 39 operates a compressor 42, from which the conduit 43 extends to a condenser 44, from which a conduit 53 extends to the receiver 52. From the receiver 52 a conduit 45, which has a coiled portion 46 therein to provide a flexible portion in said conduit to allow for the shifting of the position of the dough mixer between a mixing position and a discharge position, leads to an expansion valve 64 of any well known construction, from which the conduits 47 and 48 lead to the jackets at opposite sides of the dough mixer, extending into one end of the chamber 49, provided at the top of each of said jackets between the top wall 32 and the baffle member 33, said conduits 47 and 48 extending into said space, or chamber, 49 at the end thereof, at which the baffle member 33 is connected in fluid tight relation with the end wall 35. The refrigerant will, of course, pass through the passage, or chamber, 49 into the next lower passage, or chamber, 50, in each of the expansion coils formed within the jacket between the walls 30 and 31 on each side of the dough mixer, said passages 49 and 50 alternating, as will be obvious from the drawing, and the refrigerant finally reaching the suction pipe connection 65 in the bottom of said jacket portion, from which the suction line 51 leads to the suction end of the pump 42, the coiled portion 54 being provided in the suction pipe 51 to provide for flexibility thereof, to allow for the movement of said suction pipe to various positions necessary therefor in moving the mixer body from a mixing position to a discharge position, and vice versa.

Suitable thermostatic controlling means 55 and 56 are provided, in engagement with the suction line 51, as near the suction connection 65 leading from the expansion coil formed in the dough mixer body wall as is possible, these being shown at a greater distance from the suction connection than would be the case in practice in the diagrammatic view, Fig. 1, for the sake of clearness. The thermostatic means illustrated utilizes mercury as its expansible element and comprises switching means having a movable switching element 57, in the case of the thermostatic means 55, and a movable switching element 58, in the case of the thermostatic means 56. A conductor 59 leads from the contact 29 to the switching element 57, and a conductor 60 leads from the contact 28 to the switching element 58, said switching elements 57 and 58 being adapted to engage, respectively, with the stationary contacts 61 and 62, that are connected with the conductor 41.

With the switch 18 in the position shown, the thermostatic element 55 is effective to control the operation of the motor 39, and this thermostatic element is adjusted so as to maintain the temperature of the wall 31 very close to, but slightly above, the freezing point of water, it being only necessary to have the wall slightly above the freezing point of water, and adjustment being possible to keep this temperature at less than one degree above said freezing point of water. When the switching element 18 is shifted to the alternative position, whereupon the motor 17 is started and the mixing operation is begun, the movable contact 27 engages the stationary contact 28 and the thermostatically controlled switching element 57 is thrown out of the circuit, while the thermostatically controlled switching element 58 is thrown into the circuit that controls the operation of the motor 39. Said switching element 58 is adjusted to a temperature sufficiently below the freezing point of water that all the heat necessary to be extracted from the batch of dough that is being mixed will be extracted therefrom, to keep the temperature of the dough below a safe maximum limit, no matter how long the mixing operation may continue, but at a temperature that is not so low that frost will form on the inner surface 31 of the mixer body when such mixing operation is taking place.

An electro-magnetic valve 63 may be interposed in the conduit 45, and in the electric conductor 41, said valve operating to cut off flow of refrigerant through the conduit 45 to the expansion valve 64 when the circuit to the motor through the conductor 41 is broken.

It will be understood that the agitator members, in mixing the dough, throw it about in the chamber formed by the mixer body, so that various portions of the dough will engage repeatedly with the refrigerated wall of the mixer body along the curved and substantially flat wall portions thereof. As the dough contacts the refrigerated wall, heat will be extracted therefrom and as all portions of the dough will at various times be contacting the refrigerated wall, it is obvious that a substantially uniform temperature throughout the mass of the dough will be obtained, due to the cooling action of the refrigerated wall that the dough engages, which temperature will slowly rise as the mixing operation continues, but will not reach an undesirable maximum during a mixing operation sufficient to develop the gluten to the desired extent.

What I claim is:

1. In a dough mixer, a tiltable, mixing chamber having an upstanding wall, rotatable beater arms in said mixing chamber for repeatedly contacting a mass of dough with said wall, and means for cooling said dough comprising refrigerating means for said wall, comprising a refrigerant expansion chamber in direct heat transfer relation to said wall.

2. In a dough mixer, a tiltable mixing chamber having a wall, means in said mixer for repeatedly contacting a mass of dough with said wall, means for cooling said dough comprising refrigerating means for said wall, comprising a refrigerant expansion chamber in direct heat transfer relation to said wall, means for supplying refrigerant to said expansion chamber, comprising conduits having flexible portions to permit tilting of said mixer chamber and temperature responsive means for controlling the supply of refrigerant to said expansion chamber.

3. In a dough mixer, a mixing chamber, agitating means in said chamber, means for driving said agitating means, said chamber having a wall, and means for maintaining said wall at one predetermined temperature when said agitating means is stationary and at another predetermined temperature when said agitating means is being driven by said driving means.

4. In a dough mixer, a mixing chamber, agitating means in said chamber, means for driving said agitating means, said chamber having a wall, direct expansion refrigerating means for said wall and means for controlling the operation of said refrigerating means to maintain said wall at one predetermined temperature when said agitating means is stationary and at another predetermined temperature when said agitating means is being driven by said driving means.

5. In a dough mixer, a tiltable mixing chamber having an inclined wall and refrigerating means for said wall, comprising a refrigerant expansion chamber in direct heat transfer relation to said wall, said expansion chamber comprising a plurality of adjacent conduits running lengthwise of said wall interconnected alternately at opposite ends thereof to form a circuitous path for the refrigerant along said wall.

6. In a dough mixer, a mixing chamber, agitating means in said chamber, means for driving said agitating means, said chamber having a wall, and means for maintaining said wall at one predetermined temperature when said agitating means is stationary and at another predetermined temperature when said agitating means is being driven by said driving means, comprising refrigerating means for said wall and means controlling the operation of said refrigerating means comprising a thermostatic element operative to control said refrigerating means only when said driving means is inoperative and a thermostatic element operative to control said refrigerating means only when said driving means is operating to drive said agitating means.

7. In a dough mixer, a tiltable mixing chamber having a side wall, refrigerating means for said wall, comprising a refrigerant expansion chamber in direct heat transfer relation to said wall, said expansion chamber comprising a plurality of adjacent conduits interconnected alternately at opposite ends thereof to form a circuitous path for the refrigerant along said wall, means for supplying refrigerant to said expansion chamber, comprising flexible portions to permit tilting of said mixing chamber, and temperature responsive means for controlling the supply of refrigerant to said expansion chamber.

8. In a dough mixer, a mixing chamber, agitating means in said chamber, means for driving said agitating means, said chamber having a wall, direct expansion refrigerating means for said wall and means for controlling the operation of said refrigerating means to maintain said wall at one predetermined temperature when said agitating means is stationary and at another predetermined temperature when said agitating means is being driven by said driving means, said refrigerating means comprising a plurality of conduits interconnected to form a circuitous path for the refrigerant along said wall.

9. In a dough mixer, a mixing chamber having agitating means therein rotatable on a horizontal axis, and means for introducing the ingredients to be mixed therein through the top of said chamber said mixing chamber having end walls intersected by said axis of rotation, inclined side and curved bottom walls, and direct expansion refrigerating means for said side and bottom walls, said agitating means comprising members for repeatedly contacting a mass of dough with said side and bottom walls on the opposite face thereof from said refrigerating means.

10. In a dough mixer, a mixing chamber having agitating means therein rotatable on a horizontal axis, said mixing chamber having end walls intersected by said axis of rotation, side and bottom walls, direct expansion refrigerating means for said side and bottom walls, and means for controlling said refrigerating means to maintain said walls at a different temperature when said agitating means is rotating than when said agitating means is stationary.

11. In a dough mixer, a tiltable mixing chamber having a wall, means in said mixer for repeatedly contacting a mass of dough with said wall and means for cooling said dough by cooling said wall comprising means for conducting cooling medium through restricted passages in a circuitous path in heat transfer relation to said wall, and conduit means for conducting said cooling medium to said means having flexible portions to permit tilting of said mixing chamber.

12. The art of maintaining between predetermined temperature limits contents of a mixing chamber having a tendency to rise in temperature during the mixing operation, comprising maintaining the major portion of the walls of said chamber at one temperature when no mixing is taking place in said chamber, and at another temperature lower than said first temperature when mixing is taking place therein, both temperatures being below that of the materials introduced into said chamber.

13. In the method of mixing a mass of material, having a normal tendency to rise in temperature during the mixing action, cooling a mixing chamber wall to a temperature slightly above the freezing point of water, introducing the ingredients of said mass into said chamber, and mixing the contents of said chamber to repeatedly contact said wall therewith while cooling said wall to a temperature below the freezing point of water.

MERLIN A. STICELBER.